United States Patent [19]

Absolon et al.

[11] 4,226,672

[45] Oct. 7, 1980

[54] PROCESS OF SEPARATING ASBESTOS FIBERS AND PRODUCT THEREOF

[75] Inventors: Victor J. Absolon, Plaisir, France; George T. Hurst, Newport, Australia; John C. Worboys, Doncaster, Australia; George H. Barnett, North Balwyn, Australia; Ross P. Dickson, Oakleigh, Australia

[73] Assignee: ICI Australia Limited, Melbourne, Australia

[21] Appl. No.: 919,549

[22] Filed: Jun. 27, 1978

[30] Foreign Application Priority Data

| | | |
|---|---|---|
| Jul. 1, 1977 [AU] | Australia | PD0669 |
| Jul. 1, 1977 [AU] | Australia | PD0670 |
| Jul. 1, 1977 [AU] | Australia | PD0671 |
| Jul. 1, 1977 [AU] | Australia | PD0672 |
| Jul. 1, 1977 [AU] | Australia | PD0673 |
| Jul. 1, 1977 [AU] | Australia | PD0674 |
| Jul. 1, 1977 [AU] | Australia | PD0678 |
| Jul. 1, 1977 [AU] | Australia | PD0680 |
| Jul. 1, 1977 [AU] | Australia | PD0681 |
| Nov. 10, 1977 [AU] | Australia | PD2006 |

[51] Int. Cl.$^3$ ............................................. C03B 37/00
[52] U.S. Cl. ............................................. 162/3; 209/5; 106/99; 241/21
[58] Field of Search ............ 209/2, 3, 5, 9; 162/3, 162/153; 241/4, 20, 24, 21; 106/99

[56] References Cited

U.S. PATENT DOCUMENTS

| | | | |
|---|---|---|---|
| 1,606,281 | 11/1926 | Williams | 209/5 |
| 1,684,365 | 9/1928 | Dolbear | 209/2 X |
| 1,741,869 | 12/1929 | Mett | 209/2 X |
| 1,907,616 | 5/1933 | Tucker | 209/2 |
| 2,626,213 | 1/1953 | Novak | 241/4 X |
| 3,058,591 | 10/1962 | Nakahara | 209/273 |
| 3,162,380 | 12/1964 | Cohn | 241/4 |
| 3,586,639 | 6/1971 | House | 162/3 X |
| 3,679,542 | 7/1972 | Jacquelin | 162/3 X |
| 3,737,333 | 6/1973 | Sawyer | 209/5 X |
| 3,738,805 | 6/1973 | Fetzer | 162/3 X |
| 3,894,692 | 7/1975 | Sanko | 241/4 |
| 3,965,284 | 6/1976 | Xanthos | 162/3 X |

FOREIGN PATENT DOCUMENTS

| | | | |
|---|---|---|---|
| 594371 | 3/1960 | Canada | 209/5 |
| 475040 | 4/1929 | Fed. Rep. of Germany | 209/2 |
| 780619 | 4/1955 | United Kingdom | 209/2 |

OTHER PUBLICATIONS

C.A. 53138y, 71, 1969.
Chem. Abst., 71, 1969, 63753j.
Chem. Abst., 75, 1971, 132503z.
Chem. Abst., 81, 1974 6022c.
Chem Abst., 84, 1976, 21459f.
Chem. Abst., 84, 1976, 126055z.
Chem. Abst., 84, 1976, 140502z.

*Primary Examiner*—Robert Halper
*Attorney, Agent, or Firm*—Cushman, Darby & Cushman

[57] ABSTRACT

A process of separating fibres from asbestos-bearing material which process comprises the steps by treating said asbestos-bearing material with a chemical agent capable of reacting with, or adsorbing on, asbestos fibres to form a dispersion, and agglomerating said dispersion. The process gives high yields of novel fibres characterized in that the said fibres provide reinforcement in cementitious compositions.

43 Claims, No Drawings

PROCESS OF SEPARATING ASBESTOS FIBERS AND PRODUCT THEREOF

This invention relates to the separation of asbestos fibres from asbestos-bearing material. In particular it relates to asbestos fibres for cementitious compositions and to a process for isolating these fibres from asbestos-bearing material.

Asbestos is a term applied to a number of fibrous mineral silicates which may be divided into two large groups, one of which is known as amphibole which contains as sub-divisions minerals such as anthophyllite, amosite, crocidolite, tremolite or actinolite, and the other which is referred to as serpentine of chrysotile. Chrysotile constitutes the bulk of that used industrially and is to be found as a mineral deposit in many countries such as Canada, United States of America, Italy, South Africa, Russia and Australia. For most chrysotile deposits the major proportion of the asbestos component is in the form of elementary crystals or fibrils which are essentially cylindrical with an outer diameter in the range from about 200 to 500 angstroms. The origins of chrysotile are varied. Thus for example in Canada the chrysotile originates from such rocks as dunite, peridotite or pyroxenite which have been altered to serpentine by hydrothermal reactions acting upon magnesia-rich minerals, such as olivine, whilst in South Africa chrysotile occurs in sedimentary rocks and is a product of alteration of magnesium limestone.

A consequence of the different circumstances of formation of the chrysotile and its subsequent gelogical history is that the chrysotile fibres from different sources may have differences in composition or texture, in fibre dimensions or tensile strengths, or in other properties. The usual mode of occurrence of chrysotile is a "cross fibre" arrangement in which bundles of fibres are closely packed together and set at right angles to the walls of cracks and fissures that extend through the host rock of the ore body. To obtain a useful product from the ore requires, firstly, the liberation of the fibrous component and separation from it, as far as economically practicable, of the associated rock particles which detract from the product quality and value, and secondly the fiberising of fibre bundles to give smaller diameter fibres with maximum conservation of fibre length.

Mining of asbestos is often done by trenching or open pit methods, or by underground mining by tunnelling or block-caving methods to provide a crude product which is subjected to a milling treatment.

The ore brought into the mills is subjected to a sequence of steps designed to separate the fibre or fibre bundles from the unwanted rock which is then discarded. In many cases large quantities are milled since only a small percentage of the mined rock consists of recoverable asbestos.

The conventional separation of the asbestos fibres from the rock consists of crushing the rock, passing through vibrating screens, drying, further crushing stages, separation into fibres, sieving, and removal of the fibres by suction. Both crushing steps are multistage, that is, after each initial crushing and screening the incompletely broken rock is repetitively crushed and screened until the desired disintegration of the material is complete.

In the first breakage stage the material is subjected to continuous comminuting action but in the stages after drying the treatment is comparatively brief, and involves bouncing, teasing and jolting rather than crushing and mashing. Among the machines used are roller mills, cone mills, rod mills, vertical openers, ball mills, fine rotary crushers, tube mills, and various hammer mills. Special equipment has been developed to handle some of these crushing stages.

The material in some deposits may comprise relatively short length fibres or may be unusually resistant to fiberising by conventional dry milling practices. As a result the proportion of the potentially available fibre which can be recovered in commercially useful form is reduced substantially and the economic feasibility of processing is adversely affected.

The vigorous breaking and grinding of solid rock masses to release fibre bundles leads to extensive breaking of the longer fibres and consequent economic losses. Many attempts have been made to improve the conventional processes to maximize the production of the longer fibres but these have only been partially successful.

It is an object of our invention to provide an improved process for separating asbestos fibres from asbestos-bearing material wherein the breaking of the longer fibres is minimized.

A disadvantage of all conventional dry crushing processes is that during milling dust is produced in the form of rock and fibre fines in larger quantities. Huge baghouse installations have to be employed to provide satisfactory working conditions by reducing dust and recirculating clean filtered air. Workers are regularly examined and x-rayed by medical staff, and a medical history of each worker established. Workmen are provided with suitable dust masks to protect the nasal passages and lungs from inadvertent exposure to dust. These masks require regular inspections and sterilizations. Some workmen are found to be allergic to the dusts and have to be transferred to alternative work.

It is a further object of our invention to provide a process for separating asbestos fibres from asbestos-bearing material wherein the dust hazards that are associated with conventional processes are considerably reduced.

It has been found that for certain deposits the conventional treatment is comparatively ineffective. For example, with certain asbestos-containing deposits such as are found in some areas in Australia, the veins of chrysotile have been converted to a state in which some of the asbestos remains persistently as comparatively large bundles of fibres throughout the processing. Hitherto it has not been advantageous commercially to recover the fibre content of such bundles or spicules in a form which was useful.

It is a yet further object of our invention to provide a process for separating asbestos fibres from asbestos-bearing material that cannot be satisfactorily treated by conventional process.

Various classification schemes are used to describe the grades of the fibre products from asbestos mills, but that adopted by the Quebec Asbestos Producers Association is widely recognized. Broadly the classification involves nine groups having decreasing fibre lengths.

Groups 1, 2 and 3 cover various spinning grades used for textile production. Groups 4 to 6 are medium length fibres which are used for asbestos-cement production, the longer grades attracting higher prices. Group 4 is preferred for asbestos-cement production, Group 5 is called the "paper stock grade" and Group 6 is largely limited to paper and shingle production.

Group 7 consists of "shorts and floats", and Groups 8 and 9 are used as sands and gravel.

The greatest part of the asbestos produced throughout the world is consumed in the manufacture of asbestos-cement products. Consequently considerable effort has been expended in trying to develop better methods of recovering the grades suitable for this application.

This is particularly true for areas containing the difficult ore deposits described above. In such cases the commercial dry fiberising operations give yields of only 2–6% w/w (based on mill feed) of fibre of grades suitable for asbestos-cement manufacture.

It is a still further object of our invention to provide a process of separating from ores asbestos fibre suitable for asbestos-cement manufacture, in greater yields than have been obtained in conventional processes from these ores.

It is another object of our invention to provide a process for obtaining asbestos fibres from a wide range of asbestos-bearing materials, for example, crude ore, mill feed, selected streams from conventional dry and wet processes, tailings, mine wastes, and low grade short fibre.

We have now discovered a process which satisfies the above objects. It is a particular and surprising feature of the process of our invention that the fibres obtained are novel, and have new properties including the ability to impart good strength in cementitious compositions. The novel asbestos fibres from the process of our invention comprise asbestos fibres and agglomerates of fibres and fibrils which retain a fibrous character and which may have up to 20% w/w of surfactant adsorbed on or absorbed in the asbestos, but usually contain less than 10% w/w of residual surfactant.

Because of the new nature of our fibres this ability to reinforce cementitious compositions may not be correctly indicated by some of the conventional tests used to grade asbestos fibres. Evaluation of this property by forming asbestos-cement plaques or sheets in accordance with the standard procedures employed in the industry and measuring the characteristics of this asbestos-cement, is the most directly relevant method.

When our process is applied to ores capable of yielding 2–6% w/w of asbestos-cement grade fibre when treated by the prior art wet and dry process, yields of 8–15% w/w acceptable fibre are obtained.

Similar yield improvements are obtained when the process is applied to the softer, more easily treated ores.

It is a particular feature of our invention that the process can be applied to low grade short fibre that is unacceptable for use in asbestos-cement compositions, to produce an elongated agglomerated fibre of length substantially greater than the fibre from which it was derived, and wherein said elongated agglomerated fibre provides reinforcement of cementitious compositions.

Further advantages associated with the fibres of our invention are that they can be shipped in a moist condition from the processing plant and used directly in forming cementitious compositions without pre-grinding, thus also avoiding the generation of potentially harmful air-borne dusts during handling.

While the more specific embodiments of this invention are directed to fibres for the manufacture of asbestos-cement articles by filtration of particulate materials from a slurry comprising asbestos fibres and hydraulic cement, it is to be understood that the broader aspects include fibres for the manufacture of a variety of asbestos-containing articles, including those derived by extrusion processes.

Accordingly we provide a process of separating asbestos fibres from asbestos-bearing material which process comprises firstly, treating said asbestos-bearing material with a chemical agent to form a dispersion and secondly agglomerating said dispersion.

The chemical agents suitable for the process of our invention are discussed hereinafter. In a preferred embodiment of the process of our invention we agglomerate the said dispersion by addition of a diluent. The most useful diluent of our process is water which is usually readily available, inexpensive, safe, does not pose disposal problems, and is an excellent solvent for most of the chemical agents useful in our process. Repeated reference to water and aqueous solutions is made throughout this specification but this is not to be understood as limiting, since other solvents or co-solvents such as alcohols can be used.

A wide variety of asbestos-bearing materials may be treated by the process of our invention to give improved yields of fibre suitable for reinforcement of cementitious products or to utilise otherwise waste material. These include raw ore, partially classified mill feed, tailings from conventional processes, mine wastes, and fibre concentrates from either wet or dry processes. The actual sequence of operations in our process and the number of auxiliary steps for any particular asbestos-bearing material is determined by the necessity to liberate fibre from non-fibrous particles, or to separate from the product, at various convenient stages, the grit, dust, unopened fibres or other material which would lower the performance of the product below the desired level.

When the process is presented with a clean fibre concentrate, albeit of short or lower grade fibre, the required number of steps may be as follows (FIG. 1):

(a) Contacting the asbestos-bearing material with an aqueous solution of a suitable chemical agent to form a slurry.

(b) Fiberising the solids in the slurry with the aid of a suitable mechanical device.

(c) Coagulation of the dispersed fibre to form stringy fibre agglomerates.

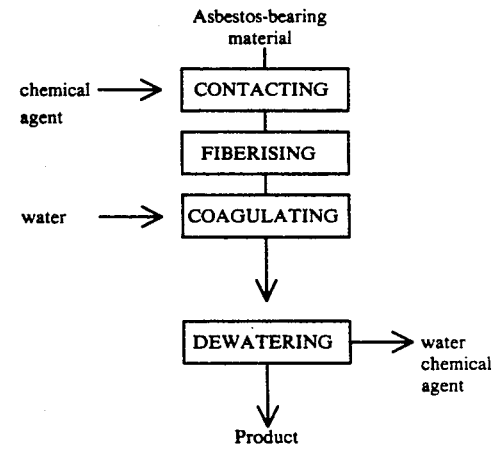

Figure 1

The product is typically subjected to a dewatering stage and may be dried prior to being transported in dry form to the site of manufacture of the asbestos-cement articles. Alternatively, and with reduction of dust hazards, the product may be transported in a moist condition. In yet another embodiment a partial dewatering stage is used and the partially de-watered product used directly to prepare the cementitious compositions used for making asbestos-cement articles.

In another embodiment of our invention the process is used to treat run-of-mine ore. Additional stages are needed, and typically the process as applied to chrysotile-containing ore comprises the following steps (FIG. 2):

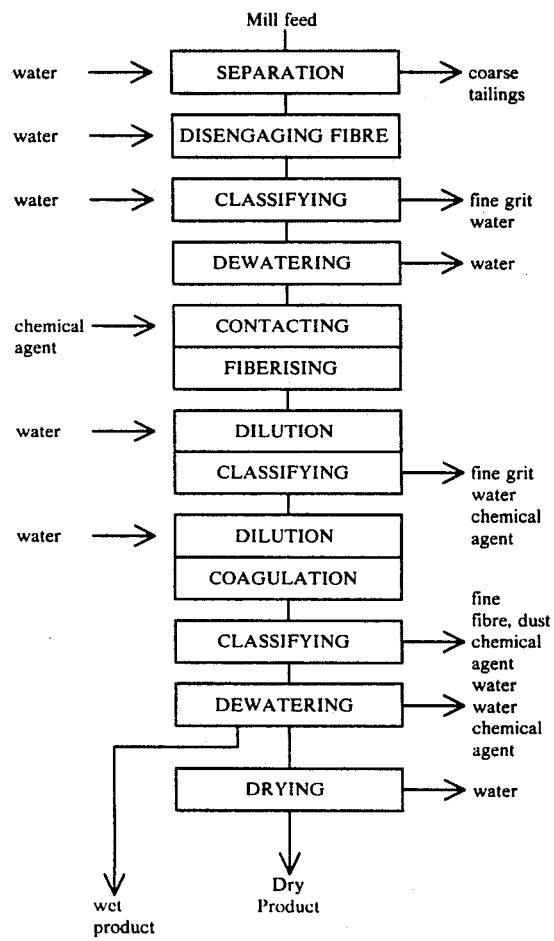

Figure 2

(1) a crushing step to convert the asbestos-bearing material to mill feed,
(2) a screening and gravity separation step to remove large grit (typically larger than 10 mesh) containing little asbestos,
(3) a wet grinding or crushing step to liberate and partially open the asbestos fibre bundles,
(4) a first classification step to produce a fibrous concentrate from which particles of non-fibrous components have been substantially removed,
(5) a dewatering step,
(6) a contacting step where the partially-opened fibre bundles are treated with a suitable chemical agent,
(7) a fiberising step,
(8) a dilution step, to reduce slurry viscosity sufficiently for further classification,
(9) a second classification step to further remove unwanted grit,
(10) a slurry dilution step to induce coagulation of fibres and form stringy fibre agglomerates,
(11) a third classification step to remove residual particles of unfiberised materials and some of the shortest fibres, if required, and
(12) a dewatering step.

This process scheme will now be discussed in more detail to illustrate and to indicate preferred and optional embodiments of our invention.

When the raw materials for the process is mined ore, the initial crushing (1) is that normally used for the conventional dry crushing of asbestos-containing rock. Typically this is carried out in a jaw crusher or a cone crusher and the asbestos-bearing material may be moistened to reduce dust formation at this stage also. The feed is selected by passing through a screen, and this is typically of $-\frac{3}{8}$ inch mesh. Wet crushing may also be used for this stage.

This feed may then be subjected to screening (2), for example, wet screening to remove the bulk of the coarse material above the desired mesh size. This coarse material is then subjected to a gravity separation involving, for example, panning, wet shaking tables, or classifiers. A small percentage of desired asbestos fibres is recovered at this stage and is returned for treatment in subsequent steps of the process; the coarse non-fibrous waste is discarded.

The fibre-containing solids are subjected to a wet grinding step (3). This can be carried out conveniently in rod mills or ball mills and in practice it may be advantageous to have more than one stage of grinding with the same or different types of grinding equipment in sequence with a corresponding number of stages of particles classification (4). The solids content of the slurry during grinding is typically 20 to 70% by weight.

In one embodiment of our invention a dilute solution of a chemical agent is introduced during the wet grinding step (3). The chemical agent introduced at this stage will usually be the one to be used in the subsequent stage of contacting. While the chemical agent can be a different one selected from those described hereinafter, and while the chemical agent can be the same as that used for fiberising but in a solution specifically prepared for this step (3), it is an advantageous feature of our invention that it is possible to recycle to this stage process solution containing excess chemical agent separated from the fibre product at a later stage of the process. This is a practical convenience in avoiding the need to dispose of solutions, reducing chemical agent and water usage, and thus is of considerable economic value.

The purpose of this stage (3) is not to produce a high degree of fiberisation, but rather to give a slight "fluffing" of the fibres to accentuate the apparent density differentiation of the fibres and the rock so that the separation in the following classification stage is facilitated. In this process it is also possible to achieve efficient liberation of fibre from the non-fibrous components in the mill feed with a minimum reduction of fibre length by breakage.

The aqueous slurry of solids from this milling stage (3) is subjected to a first classification (4) for the purpose of producing a fibre concentrate for subsequent chemical treatment, by removing non-fibrous particles from the main process stream. The purpose of this step is to maximise both the retention of fibre and the elimination of gangue. The latter not only degrades the product quality but can decrease plant capacity and increase chemical agent consumption if left in the circuit during subsequent steps.

This classification step (4) may involve sequential use of several similar or different types of hydraulic classifiers in order to achieve the optimum separation of components for a particular ore. The coarsest particles may be first separated by wet screening or by use of slime/sand separators such as spiral, bowl, or hydraulic cone classifiers, and then subjected to further treatment, such as a wet shaking table or hydrocyclone, to recover fibre-containing particles from this stream.

The stream carrying the smaller particles is subjected similarly to further stages of hydraulic classification, using, for example, hydrocyclones. The fibre-containing solids fractions so separated may be accumulated as a single fibre concentrate or presented separately to the subsequent steps of the process whereby the best process conditions may be selected more readily to achieve optimum yield and quality of product.

In order to maintain suitable control of water flows throughout the process circuit, or to isolate various soluble components to particular sections, the bulk of the water from the fibre containing fractions may be separated (5) using basket or bowl type centrifuges or other filtration devices. This water is available for recycle.

In a further embodiment of our invention the fibre containing fractions from the classification step (4) may be mixed prior to the dewatering step (5) with process solutions containing chemical agent, recycled from a later stage in the process (12). The adsorption of the chemical agent on the fibrous solids provides a convenient way of recycling and re-using some of the agent.

The opening of the fibre bundles to produce fibres, in the presence of a selected solution of chemical agent may be carried out in two distinct stages, i.e., contacting (6) and fiberising (7), or these stages may be essentially combined so that they are concurrent and the time of contacting is comparatively short. The choice of conditions for stages (6) and (7) is a matter of experiment and depends substantially on the nature of the asbestos-bearing raw material entering the process.

In the contacting step (6) the fibrous solid from the classification stage is suspended in a solution containing the appropriate amounts of the chemical agents referred to hereinafter, the quantities of solids, chemical agents and water being selected according to the degree of fiberisation required and viscosity of the resultant slurry. This slurry is optionally allowed to stand quiescent or with gentle agitation for a period of time to facilitate wetting and penetration of the solids by the solutions and to promote incipient fiberising. The optimum period of time is established by core laboratory experiments for the particular crude ore. The slurry is then subjected in the fiberising step (7) to the action of a suitable device providing sufficient energy to the system to separate the fibre bundles into smaller diameter fibres or fibrils with minimum shortening of length. This can be done, for example, by means of a ball mill, high speed macerator, colloid mill, or ultrasonic disintegrator.

In a preferred embodiment the contacting step (6) is carried out at elevated temperatures. For example, at 90° C. the time required for fiberising the solids is significantly reduced and less severe application of mechanical energy is required, which is beneficial to retaining length in the resultant fibres. Temperatures above 100° C. can be employed using an autoclave at elevated pressures. The upper limit for the temperature is near 300° C.–400° C. but we prefer to operate below 200° C. In practice the selection of the best temperature/time conditions is largely an economic consideration for any particular ore. The elevated temperature conditions can also be maintained during the fiberising step with advantage.

The ratio by weight of water to solids in the contacting stage is in the range 1:2 to 20:1, preferably in the range 3:2 to 6:1. According to the nature of the fibre concentrate being treated and the type of fiberising device being used, additional water or recycled process solution may be added in the fiberising step. The necessity to pump slurries from one process stage to another can put practical limits on the viscosity which can be tolerated.

The chemical agents added in the contacting stage (6) for promoting the fiberising (7) of the chrysotile may be ionic or nonionic in character or mixtures of the two types. They are characterised in that they react with or are adsorbed on the surfaces of the asbestos fibres and consequently facilitate the opening of the fibres under the influence of the mechanical fiberising devices, and maintain the fibres in stable dispersion. The initial concentration of the chemical agents in the water is more than 0.01% w/w and preferably more than 1% w/w in the contacting stage and preferably also in the fiberising stage. Incremental additions of the chemical agents can be made during these stages to maintain or increase the concentration.

Preferably the chemical agents are surfactants and are selected from the classes of anionic, cationic, non-ionic, and amphoteric surfactants. We have found that ionic surfactants or mixtures containing them are particularly useful. The most preferred surfactants are of the anionic type and mixtures of anionic and non-ionic types. Where mixtures of surfactants are used they may be added together in the processing or added in sequence when this is beneficial to either the fiberising, the subsequent coagulation, or the properties of the final product. In the latter case, for example, the mixture of surfactants may be chosen to facilitate the re-dispersion of the fibres in making cementitious compositions such as asbestos cement.

In the case of the preferred surfactants, some of the surfactant remains strongly adsorbed even after extensive dilution of the fiberised dispersion.

The concentration and conditions required for optimum fiberising vary according to both the nature of the surfactant and of the chrysotile. Because of its effects on the surface charge of the chrysotile, the pH of the solution influences the surfactant adsorption. Amphoteric types of surfactants may display either anionic or cationic character according to the pH of the system. Mixtures of surfactants of the same type, for example, anionic, can be beneficial in optimising the overall process, but may tend to complicate aspects of the chemical agent recycle.

The surfactant or surfactants for our process may be selected from among the following groups of anionic surfactants: carboxylates, N-acylsarcosinates, alkanesulphonates, linear and branched alkylarylsulphonates, dialkyl sulphosuccinates, arylsulphonates, naphthalenesulphonates, N-acyl-N-alkyl-laurates, 2-sulphoethyl esters of fatty acids, olefin sulphonates, alkyl sulphates, sulphated natural oils, sulphated alkylphenol alkoxylates, and phosphate esters of alkanols and phenol and alkylphenol alkoxylates.

The carboxylates, sulphates, sulphonates, and phosphates may be in any of the derivative forms known to those skilled in the art, as for example, the free acid, metal salts such as the magnesium and sodium salts, ammonium and substituted ammonium salts, and esters. Typical substituted ammonium salts are those derived from mono-, di- and triethanolamine. We prefer to use the sodium salts since they are readily available and generally are convenient to use because they have good water solubility.

The preferred anionic surfactants are those with long chain alkyl groups such as, for example, nonyl, decyl, dodecyl, tridecyl, stearyl, cetyl, palmityl and myristyl.

Thus typical carboxylates that give good results with our process are sodium oleate and sodium laurate. Preferred N-acylsarcosinates are those with the acyl group selected from the group consisting of cocoyl, lauroyl, stearoyl and tall oil acyl.

Typical examples of suitable sulphates and sulphonates are ammonium lauryl sulphate, diethanolamine lauryl sulphate, sodium cetyl sulphate, dodecylbenzenesulphonic acid, sodium dodecylbenzenesulphonate, triethanolamine dodecylbenzene sulphonate, tridecylbenzenesulphonic acid, nonylnaphthalenesulphonic acid, sodium butylnaphthalenesulphonate, sodium tetrahydronaphthalenesulphonate, and α-olefin sulphonate.

The most preferred sulphonates are those derived from from sulphosuccinic acid. They are conveniently used in the form of sodium salts of the esterified acids. Specific members of this group that we have found very useful are sodium dihexyl sulphosuccinate, sodium di(isobutyl)sulphosuccinate, sodium dioctylsulphosuccinate, magnesium dioctylsulphosuccinate, disodium N-octadecylsulphosuccinamate, tetrasodium N-(1,2-dicarbethoxyethyl)-N-octadecyl sulphosuccinamate, and the sodium sulphosuccinate esters of lauric mono- and di-ethanolamides or of ethoxylated lauryl or decyl alcohols.

Suitable phosphate esters include "Teric" 305 and 306 (alkyl ether phosphates; "Teric" is a Registered Trade Mark).

Suitable cationic surfactants comprise the mono-, di-, and polyamines, amine oxides, alkoxylates of alkyl and alicyclic amines, 2-alkyl-1-(hydroxyethyl)-2-imidazolines, tetrakis-substituted ethylenediamines, amide-linked amines, and quaternary ammonium salts. The amine oxides are of the general formula

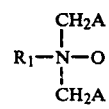

wherein A is hydrogen or hydroxyl, and $R_1$ is selected from the group consisting of cetyl, lauryl, myristyl, stearyl, coco, decyl, hexadecyl and octadecyl.

The amide-linked amines are of the general formula

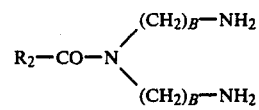

wherein $R_2$—CO—N is derived from the group consisting of coconut, oleic, stearic, and tall oil acids, and B is 2 or 3.

The quaternary ammonium salts are of the general formula

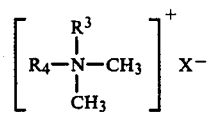

wherein $R_3$ and $R_4$, which may be the same or different, are selected from the group consisting of methyl, benzyl, tallow, stearyl, cetyl, lauryl, and myristyl, dodecylphenyl, and stearyl, and X is bromide, chloride, methanesulphonate, or toluene-sulphonate.

The dialkylpyridinium salts comprise compounds of the general formula

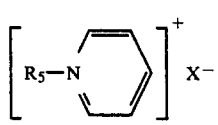

wherein $R_5$ is cetyl or lauryl, and X is as hereinbefore defined.

Cationic surfactants which we have found particularly useful include "Cetrimide" (cetyltrimethylammonium bromide), "Vantoc" CL (lauryl-dimethyl benzylammonium chloride), "Monofluor" 71, and "Fixinol" (cetyl pyridinium bromide). "Cetrimide", "Vantoc", "Monofluor" and "Fixinol" are Registered Trade Marks.

Suitable non-ionic surfactants for the process of our invention may be selected from among fatty acid esters, alkoxylated aliphatic alcohols and alkylphenols, alkoxylated fatty acids and fatty acid amides, and natural fats and oils.

Preferred aliphatic alcohols are selected from the group consisting of ethylene glycol, propylene glycol, glycerol, oleyl alcohol, lauryl alcohol, cetyl alcohol, stearyl alcohol, tridecyl alcohol, myristyl alcohol, tridecyl alcohol, myristyl alcohol, trimethylnonyl alcohol, primary $C_{12}$–$C_{13}$ and $C_{12}$–$C_{15}$ alcohols, secondary $C_{11}$–$C_{15}$ alcohols, tallow, and sorbitan, and preferred alkylphenols are selected from the group consisting of nonylphenol, dodecylphenol, octylphenol, isooctylphenol, and $C_8$–$C_{12}$-alkyl-phenols. The preferred fatty acids are lauric acid, stearic acid, oleic acid, coco acid, capric acid and myristic acid.

The carboxylic esters comprise those derived from carboxylic acids selected from the group consisting of lauric acid, stearic acid, oleic acid, coco acid, palmitic acid, ricinoleic acid, tall oil, soybean oil, rosin, tallow, lard, cottonseed, and safflower oil, and from alcohols selected from the group consisting of glycerol, sorbitan, ethylene glycol, diethylene glycol, propanediol, and poly(oxyethylene).

We prefer that the alkoxylates be ethoxylates which contain from 1 to 50 ethyleneoxy (—$CH_2CH_2$—O—) units per molecule. The amines used to prepare the fatty acid amides are selected from the group consisting of ethanolamine, diethanolamine, and isopropanolamine.

Non-ionic surfactants which we have found particularly useful include the glycol esters of oleic and lauric acid, ethoxylated nonyl phenols, polyethyleneglycol methacrylate, and "Teric" 9A8 (an ethoxylated aliphatic alcohol).

Suitable amphoteric surfactants are substituted aminoacids, such as N-coco-3-aminopropionic acid, disodium N-lauryl-2-iminodipropionate, N-carboxymethyl-n-cocoalkyl-N,N,dimethylammonium hydroxide, the sodium salt of N-hydroxyethyl-N-lauromido-$\beta$-alanine, and substituted 2-imidazolinium hydroxides.

Other chemical agents that may be used for the process of our invention include tannin, dextrin, alkanoic acids, and lignosulphates such as sodium lignin sulphonate and calcium lignosulphate. The latter are closely related to the sulphonates surfactants described hereinbefore, but are not usually considered "surfactants" by those skilled in the art.

The concentration of the surfactant in the water is chosen so that with the particular water to solids ratio, the amount of surfactant is sufficient to disperse the fibres in the particular asbestos-containing material. Less surfactant is required, for example, where the actual percentage of fibre in the asbestos-bearing material is reduced because of extraneous non-asbestos material such as grit and rock. Fibre concentrates or low grade short fibres require correspondingly more surfactant.

The preferred surfactants and surfactant concentrations for a particular asbestos-bearing material that is to be subjected to our process, can be established by simple laboratory experiments. Typically conditions are illustrated hereinafter in the examples. Such laboratory experiments parallel the "core laboratory" procedures used in conventional wet and dry processing to establish optimum conditions for particular batches of ore being received by the mill.

We have found, for example, that with intractable ores of the type found at the Yulgilbar mine in New South Wales, the preferred surfactants are the cationic type, typically amines and amine salts. In particular we have found good results may be obtained with "Teric" 17DM3 (ethoxylated $C_{17}$-diamine; 3 moles of ethylene oxide per mole of diamine) and "Teric" 18M2 nitrate salt (ethoxylated $C_{18}$-amine; 2 moles of ethylene oxide per mole of amine).

During the fiberising step (7) there is a further opportunity for the disengagement of fibrous particles from non-fibrous particles. Consequently, a second classification step (9) can be used with advantage to remove the non-fibrous particles or unopened fibre bundles from the circuit. Hydrocyclones are convenient devices for effecting this separation. It is necessary that the viscosity of the slurry of dispersed fibre from the fiberising step should be adjusted to a level enabling efficient functioning of pumps and classifying devices. This is carried out in a dilution step (8), the effectiveness of which is assisted by maintaining the concentration of the fiberising surfactant at a level which will not allow significant coagulation of the dispersed fibre. This concentration limit will depend on the particular surfactant or combination of surfactants used for fiberising and dispersing, but is approximately of the same magnitude as the critical micellar concentration for that surfactant or combination of surfactants, under the prevailing conditions of temperature and solution composition.

Prior to the next stage the slurry may be filtered or "squeezed" by suitable equipment to remove as much of the entrained surfactant solution as possible so that the amount of water at the dilution stage can be greatly reduced.

The dispersed fibres in the suspension are caused to coagulate (10) in the form of stringy agglomerates.

Although the structure of these stringy agglomerates is not known in detail, we have found that they have properties which make them useful for reinforcing cementitious composition. Furthermore, fibre which is normally unsuitable for reinforcement of cementitious compositions because of the short length or low aspect ratio, when converted to stringy agglomerates by the process of our invention is unexpectedly found to have the desired reinforcement properties. While we do not wish to be limited to the following explanation, we consider that the treatment with surfactant and subsequent coagulation provides a bonding of fibres and fibrils into the novel elongated fibres of useful dimensions which are the subject of our invention.

If the process of our invention is not followed carefully, that is if arbitrary or inappropriate dilution sequences or coagulation conditions are used, small loosely-structured clumps form instead of stringy agglomerates. These fibre clumps are difficult to collect on screens and to dewater, and considerable yield losses can occur. The preferred and optimum conditions for forming the stringy agglomerates are discussed below.

The coagulation of the dispersed fibres to form stringy agglomerates can be induced by several means, according to the nature of the surfactant used for fiberising; for example, by heating, adding a polymeric flocculent, changing pH or contacting with a solution of polyvalent cations.

Thus when ores of the Yulgilbar type are subjected to our process, polyacrylamide flocculants such as "Alfloc" and "Magnafloc" may be used. ("Alfloc" and "Magnafloc" are Registered Trade Marks).

In a preferred embodiment of this invention, using the preferred types of anionic surfactants for fiberising and dispersing the chrysotile asbestos, it is found effective and convenient to bring about coagulation of the dispersed fibres into stringy agglomerates by extensive dilution of the fibre suspension by addition to water or to dilute aqueous solutions derived from recycled process streams, but which are essentially surfactant free.

Such dilute aqueous solutions may be obtained or prepared for use in several ways. Where the process solutions recovered after the second (9) and/or third (11) classifying steps are recycled to the earlier stages (3) and (4) as described hereinbefore, much or most of the surfactant will be adsorbed on the fibrous solids of those stages, and the recovered solution will usually be sufficiently free of surfactant to be used directly in the coagulation step. Alternatively, any or all of the recovered process solutions containing surfactant can be diluted to the necessary degree with water. In yet another alternative, the process solutions containing surfactant may be transferred to storage tanks and ponds so that biological degradation of the surfactant may occur, thus reducing the concentration of surfactant to the level desired for re-use of the solution in the coagulation stage.

The coagulation of the fiberised dispersion can be effected in several ways. The dispersed slurry can be poured in a thin stream or pumped through jets into a large volume of water which is stirred gently with a circular motion. An alternative is to bring together in the correct volume ratios the streams of fibre slurry and diluting water by pumping both through a pipe, or a hydrocyclone for example.

The slurry may be injected at one end of a pipe along which water is flowing, where the length of pipe is chosen to provide an adequate section for the turbulent mixing of slurry and water. In one embodiment the water and slurry are introduced into the pipe at the same point. In this embodiment the area of turbulence preceding plug flow is shortened. The coagulated stringy agglomerates obtained are readily handled in-subsequent stages.

In a preferred embodiment, the coagulation to stringy agglomerates is effectively brought about by transferring the viscous fibre dispersion onto a screen, typically 200 mesh, into a zone covered by many fine jets of diluting water under pressure, thus providing the desired dilution ratio. By this method some removal of undesirably small particles can be achieved simultaneously. The coagulated stringy agglomerates remains on the screen. Another advantage of this embodiment is that the amount of subsequent dewatering may be significantly reduced.

The extent of dilution required for the coagulation stage is dependent in part on the concentration of surfactant in solution in the fiberised dispersion. In practice, it is desirable to keep to a minimum the amount of dilution required and the excess of surfactant used in fiberising. During the dilution additional surfactant enters the solution by desorption from the fibre surfaces. The preferred conditions of dilution for the production of the stringy agglomerates of our process are such that will give solids to water ratios in the range of 1:20 to 1:1500, preferably in the range of 1:70 to 1:400, and surfactant concentrations in the solution from 0.01 to 0.1% w/w. If the dispersed fibre slurry is partially diluted to facilitate transfer, e.g. by pumping, to the coagulation stage, the dilution ratio used in the coagulation stage is adjusted accordingly.

The loosely-structured fibre clumps referred to hereinbefore are likely to form if the dispersed fibre slurry, or more particularly the partly-diluted but non-coagulated slurry is allowed to stand for long periods. If this does occur the dispersed slurry can be re-constituted by the addition of further surfactant. The amount of additional surfactant required depends on the degree of dilution and clumping, and may be readily established by laboratory experiments. Alternatively, surfactant can be added portion-wise with gentle stirring or agitation until a suitable dispersed slurry is obtained.

After coagulation it is convenient to further refine the fibre product in a third classification step (11) by removing residual dust, grit or other particles which can degrade the product quality. This classification can be carried out using hydrocyclones, for example.

The product is collected by dewatering (12) the slurry of coagulated fibre. This step may be carried out in one or more stages; for example, by vacuum or centrifugal filtration. With particular surfactants the solid will be sufficiently aerophilic to be separated by froth flotation. Indeed, the dewatering may be associated with the third classification step; for example, by employing a solid bowl centrifuge to recover product while allowing unwanted particles to pass out with the effluent solution; similarly a screen may be used as the first collection device for recovering the solid product. Additional dewatering can be achieved using a pressure filter, for example, according to the tolerable water control in the product. The wet asbestos product can be packed and transported as such to users, such as asbestos cement manufacturers. It can be readily formed into pellets, sheets, or other forms convenient for handling. The wet product reduces the dust hazard normally associated with the handling of dry fibre both at the producer and user plants. However, if the dry product is required, the remaining water can be readily removed by heating.

The fiberising surfactant is ultimately distributed in several streams; the fibre product itself contains surfactant, the various solids wastes each remove a proportion of the surfactant, and the process solution separated from the fibre a substantial fraction of the input surfactant. For economic and environmental reasons it is desirable to recover at least part of the surfactant from the process solutions before discarding them to waste. This has been referred to hereinbefore, but will now be discussed further.

Conservation of water as well as reagents is necessary in many mining locations; consequently, maximum recycle is desirable within the process. Substantial separation of surfactant from process solutions can be achieved by adsorption on the fibre concentrate entering the process or even on the ore feed; the purified process solutions can then be used elsewhere in the process; for example in the coagulation stage. Similarly, the surfactant can be scavenged outside the process circuit, for example, on tailings heaps, before discarding the water to waste.

In one embodiment of the process of our invention the surfactants used in the fiberising step are chosen from among those surfactants that are known to biodegrade readily. Considerable research has been devoted to the development of biodegradable surfactants in recent years to avoid environmental contamination, particularly by selection of the appropriate chain length and branching of the alkyl groups. The surfactants with high biodegradability are well known to those skilled in the art of surfactants.

While the biodegradation of the surfactants in solution can be allowed to occur naturally in large vats or ponds exposed to bacteria in air and soil, it is preferable to add microorganisms to reduce the amount of time required for the degradation of the surfactant. Such microorganisms may be pure strains or a mixture of strains. The latter are ordinarily employed, and convenient sources are river water, sewage effluent, activated sludge, or soil. The nature of the source is not critical since research on the development of biodegradable surfactants has shown that the composition of naturally occurring microorganisms is comparatively constant despite the diversity in origin of the material.

Where the dilute surfactant solution is kept in ponds with only the naturally occurring microorganisms of the soil forming the base and sides of the ponds, the residence time for essentially complete biodegradation of the surfactant will be several weeks. The deliberate introduction of the microorganisms described hereinbefore easily reduces this residence time to 5 to 7 days. Optimally the residence time can be reduced to 2 to 3 days.

The level of surfactant can be monitored by chemical analysis or, conveniently, by physical measurement of surface active properties. It is not essential that all the surfactant be biodegraded. The water recycled to the wet grinding step (3) or after step (4) may with advantage contain residual surfactant. In one aspect of this embodiment two series of recovery ponds are employed. In one series the water is recycled to steps (3) and (4) as described above, while in the other series of ponds the biodegradation is allowed to proceed to or near completion to provide water for the coagulation step (6).

Any of the prior art methods of recovering surfactants from solutions may also be used. For example, solutions of ionic surfactants may be treated with ionic reagents of opposite anion/cation character to form precipitate from which the ionic surfactant can subsequently be regenerated. Alternatively, any of the means of removing surfactants from solutions known to those skilled in the art may be used, such as flash evaporators, multi-stage evaporators, reverse osmosis equipment, or solvent extractors.

Depending on the selection of surfactant for fiberising, it may be necessary to limit the accumulation of electrolytes or other solutes in the process solutions by increasing the proportion of water bleed in the circuit or addition of a separate ion exchange, ultrafiltration or similar water treatment operation.

In a further embodiment of our invention we provide a process of treating short fibre grades, e.g. tile grades, such as are obtained as a by-product of conventional wet and dry processes. These short fibres are not usable per se in cementitious compositions where reinforcement properties are required, but can be converted to the useful novel fibres of our invention. Typically such short fibres are subjected to a short circuit comprising treatment with a surfactant solution to form a dispersed slurry, followed by coagulation by any of the methods hereinbefore described.

This embodiment can be used as a pre-treatment by asbestos-cement producers to enable a wider range of fibres to be used to produce acceptable asbestos-cement products. Conveniently the coagulated fibre may be transferred directly to the asbestos-cement forming equipment without a dewatering stage. Depending on the amount of diluent used an intermediate filtration may be desirable to reduce the bulk of the coagulated slurry and to facilitate handling.

Before or after shipment of the fibres they may be subjected to further treatment, for example heat treatment, or additives incorporated as desired by the user. For example the fibres may be treated with a solution of an alkaline reagent to modify the hydrophobic/hydrophilic balance of the fibre surfaces to suit the particular requirements of the asbestos user.

The nature of the alkaline reagent is not narrowly critical; an alkali hydroxide such as sodium hydroxide may conveniently be used. The ratio of sodium hydroxide to the fibre solids content may be selected to remove the desired amount of adsorbed surfactant. The quality of alkaline reagent required for this purpose can be determined by chemical analysis of a solution of the adsorbed surfactant obtained by extraction from a sample of the solid fibres by means of a suitable solvent such as methanol. It is desirable to avoid unnecessary excess of the alkaline reagent.

Similarly the agglomerated fibres from our process may be heated to modify the hydrophobic/hydrophilic balance to suit the requirements of a particular cementitious composition. The amount and nature of the adsorbed surfactant residues on the fibres can be modified in this way.

In summary it can be seen that the process of the invention has important benefits. It enables one to provide higher yields of chrysotile fibre product having a quality suitable for use in asbestos cement, the most important asbestos use. Likewise, it can upgrade the fibre content of either low grade concentrate or tailings. Consequently, the process will extend asbestos resources.

The process, being wet from an early stage, reduces the asbestos dust hazard associated with the conventional dry process. Again the wet process results in a damp product, unless diliberately dried, which can be marketed as such with advantages in reduced dust during packing, transport and redispersion in asbestos cement slurries. Tailings are less hazardous because of the more complete removal of fibre, particularly of small sizes.

The process of our invention is now illustrated by, but by no means limited to, the following examples. All parts and percentages are on a weight basis.

EXAMPLE 1

This is a comparative example showing the yield of fibre recovery by the conventional dry process.

A sample of -⅜ inch mesh mill feed was obtained brom the Woodsreef Mine in New South Wales. This sample was representative of mill feed fed to the conventional dry process over a period of 24 hours. The sample had been subjected to a "core laboratory recovery" procedure, which is used routinely at the mine to provide advance estimates of mill recoveries. The results of the core laboratory recovery are tabulated below, together with the actual recoveries on mill feed fed to the mill during that 24 hour period. The percentage recovery is based on the initial weight of mill feed.

| % Fibre Recovery | | | | | | | |
|---|---|---|---|---|---|---|---|
| Actual Mill Grades | | | | To- tal | Core Laboratory Measured Grade | | Total |
| C65-80 | C50-80 | C40-80 | C33-80 | | C65-80 | C35-80 | |
| 0.58 | 2.11 | 0.69 | 0.09 | 3.86 | 1.1 | 3.47 | 4.57 |

EXAMPLE 2

A further sample of the mill feed of Example 1 was treated by the following procedure.

The mill feed was first wet screened to remove +10 mesh non asbestos-bearing rock so that only potentially productive rock was treated in later stages. The remaining material was mixed with water and then ball milled to partly open the fibre bundles. After filtering to remove the balls classification was carried out by wet panning and fine grit and unbroken spicules removed. The yield of fibre concentrate, calculated on a dry basis after drying a representative portion, was 32.5%.

EXAMPLE 3

This example illustrates wet screening and wet milling of mill feed as pre-treatments in our process.

A sample of the mill feed of Example 1 was classified by wet screening and gravity separation (panning) by the scheme below:

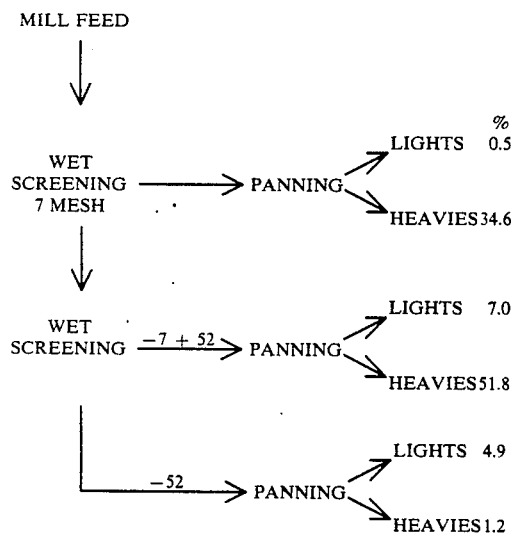

Visual and microscopic examination of the rejected "heavies" from this procedure confirmed that large quantities of fibre had not been recovered.

A similar sample of mill feed was then subjected to wet ball milling with 1 liter of water in an 8 inch diameter mill operating at 80 rpm. The ball charge was as follows:

| Size (mm) | Number |
|---|---|
| 12 | 47 |
| 19 | 58 |
| 25 | 31 |
| 32 | 6 |

After 10 minutes milling the product was separated from the balls and classified by the scheme used above with the unmilled material. The total recovery of fibre was 27.9% (based on original mill feed, and the fibre size is shown in the following comparison with unmilled material.

| | % Fibre (on mill feed) | |
|---|---|---|
| Mesh Size | Before milling | After milling |
| +7 | 0.5 | 7.2 |
| +52 | 7.5 | 17.5 |
| Total | 12.5 | 27.9 |

EXAMPLE 4

The moist fibre concentrate (100 g) of Example 2 was added to a hot (90° C.) aqueous solution (250 ml) containing "Matexil" WA-OT (12.5 mls; 50% sodium dioctylsulphosuccinate) and dodecylbenzenesulphonic acid (DDBSA) (1.25 mls). The mixture was subjected to vigorous shear stirring in a domestic type high speed macerator for two minutes and then diluted by pouring slowly into hot water (30 liters). ("Matexil" is a Registered Trade Mark). The slurry was decanted from the grit that settled on the bottom and filtered to recover the fibres. After drying the fibres weighed 74 g, ie 74% recovery. This is a 24% yield based on the original mill feed.

The quality of the fibre was comparable to that of the C65-80 grade obtained from the conventional dry process at Woodsreef Mine. This comparison was based on the standar Bauer McNett measurement of fibre size distribution and the other relevant parameter, freeness.

| | % Fibre | | | |
|---|---|---|---|---|
| Source of fibre | Bauer McNett Screen Size | | | Freeness (secs) |
| | +4 | +14 | −200 | |
| Woodsreef Mine Monthly averages for C65-80 grade | | | | |
| January 1977 | 12.9 | 36.9 | 28.0 | 71.9 |
| February 1977 | 10.6 | 36.0 | 28.2 | 79.4 |
| March 1977 | 13.6 | 36.4 | 28.0 | 102.3 |
| April 1977 | 14.2 | 38.0 | 27.4 | 84.6 |
| Example 4 | 13.6 | 48.8 | 29.6 | 91.0 |

EXAMPLE 5

The procedure of Example 4 was repeated except that no DDBSA was added. The yield of fibre was 20% based on the original mill feed and the test results are shown below.

| Bauer McNett Sizing, % | | |
|---|---|---|
| +4 | +14 | −200 |
| 16.9 | 42.9 | 35.0 |

EXAMPLES 6-11

The mill feed of Example 1 was treated by the procedure below and the weights in grams of "Matexil" WA-OT and DDBSA varied as shown in Table 1.

TABLE 1

| Example | I "Matexil" WA-OT (50% active) | II DDBSA | Ratio of Active constituents, I/II |
|---|---|---|---|
| 6 | 50 | 12.5 | 2:1 |

TABLE 1-continued

| Example | I "Matexil" WA-OT (50% active) | II DDBSA | Ratio of Active constituents, I/II |
|---|---|---|---|
| 7 | 20 | 2.5 | 4:1 |
| 8 | 1 | 0.25 | 2:1 |
| 9 | 50 | 7 | 3.6:1 |
| 10 | 40 | 5 | 4:1 |
| 11 | 30 | 4 | 3.75:1 |

In each case 1 kg of mill feed and 1 liter of water were placed in a vessel, the solution of surfactants added, and the mixture stood for one hour with intermittent stirring. The mixture was then tumbled briefly (10 min) in a ball mill containing the same ball charge as used in Example 3.

The mixture was then classified by the wet screening and panning procedure described in Example 3.

The yields of various fibre sizes obtained by this classification are shown in Table 2 below.

TABLE 2

| Mesh size | % Fibre (on mill feed) Example No |||||
|---|---|---|---|---|---|
| | 6 | 7 | 8 | 9 | 10 | 11 |
| +7 | 2.2 | | 0.1 | | | |
| +52 | 30.3 | 35.7 | 20.1 | | | |
| Total | 35.0 | 36.0 | 29.3 | 31.0 | 34.1 | 38.1 |

EXAMPLE 12

The fibres from Example 4 were formed into an asbestos cement plaque as used for a Fibre Strength Unit test. The procedure used was based on the Standard Test adopted by the Quebec Asbestos Mining Association. The measured flexural strength (modulus of rupture corrected for density) was 206 kg/cm$^2$ at a fibre content of 9.5%.

EXAMPLE 13

A sample (100 g) of fibre concentrate was treated with 250 ml of solution containing "Matexil" WA-OT (3%) and sodium dodecylbenzenesulphonate (1.5%) by the procedure described in Example 4. The recovery of dry fibre was 66.5%, which represented a 22.7% yield based on the original mill feed. The flexural strength of standard asbestos cement plaques was 201 kg/cm$^2$ at 11.4% fibre content.

EXAMPLE 14

A sample (100 g) of fibre concentrate was treated with 250 ml of solution containing "Matexil" WA-OT (5%) by the procedure described in Example 4. The recovery of dry fibre was 71.1%, which represented a 24.9% yield based on the original mill feed. The flexural strength for standard asbestos cement plaques was 180 kg/cm$^2$ at 11.0% fibre content.

EXAMPLES 15-18

The liberation of fibre and separation and classification of fibre concentrates was carried out in a continuous demonstration unit.

Sample quantities of different lots of mill feed from a dry process, crushed to pass a 10 mesh screen, were fed by a screw feeder to either a ball mill or a rod mill, together with water. In each case the effluent slurry was diluted with a further stream of water and the resulting suspension pumped through a first hydrocyclone, the overflow from which was pumped through a second hydrocyclone. The overflow from the second hydrocyclone was pumped to a solid bowl centrifuge in which was collected most of the remaining suspended solids. The solids in the underflows from the hydrocyclones were recovered by filtration. The solid from the underflow from the first hydrocyclone comprised coarse particles of substantially barren rock. The solid from the underflow from the second hydrocyclone was a coarse fibre concentrate. The residue in the centrifuge was a second fibre concentrate comprising particles of smaller hydraulic radius than those of the first fibre concentrate. Both the fibre concentrates were suitable for feeding to the fiberising stage of the process of the invention.

The preparations of the separated solids fractions from the typical mill feeds obtained from the Woodsreef Mine are shown in Table 3.

TABLE 3

| Example No | Mill Type | Solids Feed Rate kg/min | Water to Mill Liter/min | Dilution Water Liter/min | Percentage by Weight |||
|---|---|---|---|---|---|---|---|
| | | | | | First Hydro-cy-clone Under-flow | Second Hydro-cy-clone Under-flow | Centri-fuge Resi-due |
| 15 | Ball | 0.6 | 1.0 | 20 | 76 | 17 | 7 |
| 16 | Ball | 0.6 | 1.0 | 20 | 82 | 11 | 7 |
| 17 | Ball | 0.4 | 0.8 | 16 | 80 | 12 | 8 |
| 18 | Rod | 0.5 | 0.8 | 20 | 83 | 11 | 6 |

EXAMPLE 19

The centrifuge residue from Example 15 was tested by the Bauer-McNett sizing method. The results showed: 1.2% +4 mesh, 6.0% +14 mesh, 77.9% −200 mesh.

Asbestos cement plaques made from this fraction and containing 18% fibre showed a flexural strength of 244 kg/cm$^2$.

EXAMPLES 20-21

Two samples (200 g) of the fibre concentrate from the underflow of Example 16 were mixed with 600 ml of "Matexil" WA-OT solutions of 5% and 3% concentration, respectively, and stirred for 5 minutes. The mixtures were subjected to low pressure for 15 minutes. The slurries were twice passed through a disc mill. The resultant viscous suspensions were each divided with 2 liters of 0.25% "Matexil" WA-OT and passed through a hydrocyclone system. The hydrocyclone overflows were each diluted into 20 liters of water by passing through a peristaltic pump and then out through a narrow rubber tube moved in a circular motion through the water. The diluted suspensions of stringy fibre agglomerates were each passed through hydrocyclones and the overflows centrifuged to collect the solid products, which were further dewatered by means of a pressure filter. The yields of product, the Bauer-McNett sizings and the flexural strengths of asbestos cement plaques at 12.5% fibre content are shown in Table 4.

TABLE 4

| Example No | Conc. "Matexil" WA-OT % | Flexural Strength kg/cm$^2$ | Yield % | Bauer-McNett Sizing % |||
|---|---|---|---|---|---|---|
| | | | | +4 | +14 | −200 |
| 20 | 5 | 237 | 23 | 2.6 | 12.4 | 68.9 |

TABLE 4-continued

| Example No | Conc. "Matexil" WA-OT % | Flexural Strength kg/cm² | Yield % | Bauer-McNett Sizing % | | |
|---|---|---|---|---|---|---|
| | | | | +4 | +14 | −200 |
| 21 | 3 | 187 | 19 | 2.0 | 9.9 | 71.2 |

EXAMPLE 22

A sample of −⅜ inch mesh mill feed was obtained from the Yulgilbar Mine in New South Wales. This material was classified by wet gravity separation (panning) to produce a light fibrous fraction.

This fibre concentrate (100 g) was added to an aqueous solution (2.5% active) the nitrate salt of "Teric" 18 M2 (an ethoxylated amine, prepared by the condensation of a $C_{18}$-amine with 2 moles of ethylene oxide). Vigorous shear stirring was applied for two minutes and then the mixture was diluted by pouring into water (25 liters) to produce a finely divided and opened fibre fraction which could be separated by hydrocycloning and filtering to give a cleaned fibre product (80 g).

EXAMPLE 23

The procedure of Example 22 was repeated but with a 0.01% solution of "Alfloc" being present in the diluting water. Long fibre strands were formed which was hydrocloned and filtered to give a product of improved fibre length (80 g).

EXAMPLE 24

The procedure of Example 3 was repeated replacing the nitrate salt of "Teric" 18 M2 by "Teric" 17 DM3 (an ethoxylated amine prepared by the condensation of a $C_{17}$ diamine with 3 moles of ethylene oxide). A similar product was obtained (77 g).

EXAMPLE 25

Samples of 10 g of a mixed fibre concentrate, each comprising 7 g of second hydrocyclone underflow from Example 16 and 3 g of centrifuge residues from Example 18, were contacted with 900 ml portions of "Matexil" WA-OT solutions in a two stage counter current experiment. The mixtures were each stirred vigorously for 20 minutes and filtered between stages. The input solution contained 0.058% "Matexil" WA-OT and the final output solutions during three cycles contained 0.008%, 0.003% and 0.003% "Matexil" WA-OT, respectively. Similarly, the solids leaving the second stage of contacting during the three cycles contained 6.6%, 5.7%, and 5.1% surfactant expressed as "Matexil" WA-OT, respectively. This indicates the effectiveness of fibre concentrates for scavenging "Matexil" WA-OT from dilute solutions.

EXAMPLE 26

A sample of 600 g of Woodsreef mill feed, crushed to pass a 10 mesh screen, was mixed with 60 liters of 0.1% solution of "Matexil" WA-OT. The solid was then separated by centrifuging. The separated solid was mixed with 1200 ml of 5% "Matexil" WA-OT and the resultant slurry was then fiberised in a high speed macerator for 5 minutes. This viscous slurry was diluted with 10 liter of 0.2% "Matexil" WA-OT and then passed through a 25 mesh screen to remove grit and unopened fibre. After further clean up by pumping through a hydrocyclone circuit, the overflow slurry was diluted by running in a thin stream into 150 liters of water with gentle stirring in a circular motion. This enabled the formation of stringy agglomerates. After the agglomerate suspension was passed through a hydrocyclone, the product solids were recovered from the overflow by means of a centrifuge. The centrifuged solids were further dewatered in a pressure filter.

The yield of dry fibre was 14.3% on the mill feed. When made into standard asbestos cement plaques, it developed a flexured strength of 270 kg/cm² at 14.1% fibre content. The Bauer McNett sizing showed 1.8% +4 mesh, 12.9% +14 mesh and 48.6% −200 mesh.

EXAMPLE 27

A sample (200 g) of a fibre concentrate product from Woodsreef mill feed, by the general procedure of Examples 15 to 18, as the second hydrocyclone underflow, was added to 600 ml of 5% "Matexil" WA-OT and allowed to stand at ambient temperature for 15 minutes. This mixture was treated for a short time in a high speed macerator during which it became very viscous. It was then diluted by adding slowly to 40 liters of water while stirring gently. The suspension of fibrous agglomerates was decanted through a 200 mesh screen and the solids on the screen were washed with a spray of water. This solid product was further dewatered by filtration.

The flexured strength for asbestos cement plaques containing 15.1% fibre was 311 kg/cm². The Bauer McNett sizing showed 4.8% +4 mesh, 19.0% +14 mesh, 53.6% −200 mesh.

EXAMPLE 28

A sample of 1 kg of Woodsreef mill feed (passing ⅜ inch mesh) was mixed with 1 liter of a solution in water of 4% "Matexil" WA-OT and 0.5% dodecylbenzene sulphonic acid. The mixture was held at 90° C. for 2 hours and then fiberised in a ball mill for 20 minutes. The resultant suspension was diluted with 8 liters of water. The suspended solids were caused to agglomerate, and were simultaneously freed of grit and unopened fibre bundles, by passage of this suspension through a hydrocyclone together with a further 30 liters of water. The product solids were recovered from the overflow by means of a centrifuge.

The yield of dry fibre was 21.3% of the mill feed. The Bauer McNett sizing of the wet product was 6.1% +4 mesh, 17.4% +4 mesh, and 53.6% −200 mesh.

The yield of commercial fibre obtained in the conventional dry processing plant during the 24 hours period represented by the sample of mill feed used in this Example was 3.3%.

EXAMPLE 29

A coarse fibre and spicule fraction was separated from a commercial product from the conventional dry process (Group 4T quality) by passing a suspension in water through a suitable hydrocyclone and filtering the solids from the underflow stream.

A sample (50 g) of this fibre concentrate was contacted with 250 ml of a 5% solution in water of "Matexil" WA-OT in an autoclave at 135° C. under pressure for 1 hour. The resultant suspension was fiberised for a short time in a high speed macerator with progressive addition of 1 liter of 0.2% solution of "Matexil" WA-OT during the fiberising stage. The resultant gel-like mixture was diluted with 500 ml of 0.2% solution of "Matexil" WA-OT. This suspension was caused to agglomerate by pumping through a spray nozzle into 60 liters of water. The suspension of fibrous agglomerates was passed through a hydrocyclone which removed 5 g of solids in the underflow. The bulk of the solids in the overflow stream was collected by means of a solid bowl centrifuge.

Tests were carried out for flexural strength of asbestos cement plaques and Bauer-McNett sizing on both the products and the untreated fibre concentrate, with the following results.

|  | Flexural Strength kg/cm$^2$ | % Fibre in Plaque | Bauer-McNett Sizing % | | |
| --- | --- | --- | --- | --- | --- |
|  |  |  | +4 | +14 | −200 |
| Treated Product | 304 | 8.5 | 3.9 | 49.3 | 10.0 |
| Untreated Concentrate | 278 | 9.5 | 6.1 | 42.3 | 3.5 |

EXAMPLE 30

A sample of ore representing one blast in an open cut asbestos mine was crushed to pass a 10 mesh screen. This material (300 g) was contacted with a 7.5% solution of "Matexil" WA-OT (600 ml) and the mixture treated in an autoclave under pressure at 135° C. for 1 hour.

After allowing to cool for 1 hour the sample was treated for two minutes in a high speed domestic macerator. The resultant viscous slurry was diluted (10:1 liquid to solids) with 0.2% "Matexil" WA-OT and allowed to stand for approximately 15 minutes. The supernatant was the decanted and the residue washed with 0.2% "Matexil" WA-OT.

The settling and decanting operation was repeated twice. The supernatant dispersion were combined and the fibre content coagulated by pouring slowly with gentle stirring into 30 liters of water. The suspension of stringy agglomerates so formed was pumped through a hydrocyclone and the solids separated from the overflow stream using a solid bowl centrifuge. Some additional solid was recovered by passing the centrifuge overflow through a 200 mesh screen. This was added to the centrifuge residue and further dewatering by filtration.

An 11% yield of fibre was obtained and a standard asbestos cement plaque had a flexural strength of 303 kg/cm$^{-2}$ for a fibre content of 12.5%, the Bauer-McNett size fractions of the product were 9.1% +4 mesh, 29.4% +14 mesh, 41.2% −200 mesh.

EXAMPLE 31

This example illustrates the effect of varying the temperature of the surfactant solution/fibre mixture, and the time of contacting prior to the application of mechanical energy.

Each sample (200 g) of fibre concentrate was mixed with a solution (50 ml) of "Matexil" WA-OT (5%) and DDBSA (0.5%) that had been pre-heated to either 20°, 50°, or 80° C. The mixture was maintained at that temperature for the periods of 10, 60 and 240 minutes, and the appearance of the mixture note and recorded at the end of the period.

The resulting slurry or gel was then subjected to high speed maceration for 1 minute and diluted (liquid to solid, 200:1) by pouring into stirred water). The length of the agglomerated fibres was estimated by visual observation of samples lifted from the suspension on a spatula. The fibre products were classified A, B, C or D, in order of decreasing length. The results are tabled below.

| Temperature (°C.) | Time (mins) | Appearance | Fibre Length |
| --- | --- | --- | --- |
| 20 | 10 | Slurry | D |
| 20 | 60 | Slurry | C |
| 20 | 240 | Slurry | C |
| 50 | 10 | Slurry | C |
| 50 | 60 | Gel | C |
| 50 | 240 | Gel | B |
| 80 | 10 | Gel | C |
| 80 | 60 | Gel | B |
| 80 | 240 | Gel | A |

EXAMPLE 32

A sample (100 g) of fibre concentrate (centrifuge residue from Example 15) was contacted at ambient temperature with a solution (250 ml) of "Matexil" WA-OT (5%). The slurry was treated in a domestic high speed macerator for a short time during which an extra 250 ml of water was added and the slurry became very viscous. This viscous slurry was then placed in 25 g batches on a 200 mesh sreen and wet washed using a nozzle, as described in test procedure C-5 of the Quebec Asbestos Mining Association, operating at 20 p.s.i. and held at 4-6 inches above the screen whilst being moved in a circular motion. The retained solids were then dewatered by filtration and gave a yield of 46% of the fibre concentrate, while equals 3.2% of the original mill feed. A standard asbestos cement plaque had a flexural strength of 316 at 12.5% fibre content.

EXAMPLE 33

A sample (200 g) of fibre concentrate (second hydrocyclone underflow of Example 15) was contacted at ambient temperature with a 5% solution of "Matexil" WA-OT (500 ml). The slurry was fiberised by treatment for a short time in a high speed macerator and became very viscous. The gel-like material was transferred to a 200 mesh screen and sprayed with water as in the procedure of Example 32, but for only sufficient time to induce coagulation. The retained solids were then mixed with 20 liters of water and the suspension pumped through a hydrocyclone. The overflow stream was passed through a 200 mesh screen and the retained solids again sprayed with water at 20 lb/sq in., as in the procedure of Example 32. The solids on the screen were further dewatered by filtration.

The yield of dry fibre was 12%, and standard asbestos cement plaques gave a flexural strength of 352 kg/cm$^2$ at fibre content of 12.5%.

EXAMPLE 34

A 1 kg sample of fibre concentrate (second hydrocyclone underflow, similar to that of Example 18) was mixed by stirring with 3 liters of 4% "Matexil" WA-OT at ambient temperature. This suspension was passed three times through a high speed disc type colloid mill to effect fiberising. The resultant viscous slurry was split into five equal lots which were diluted to various extents with 0.25% "Matexil" WA-OT solution, as tabulated below. Each of these lots of diluted slurry was added to 50 liters of water by pumping through a fine jet. The coagulated fibre products thus formed were collected by passing through a 200 mesh screen, washing the solids with pressure sprays of water, and finally dewatering by filtration.

Each product was treated for flexural strength in asbestos cement plaques and Bauer McNett sizing, with the results shown below.

| First Dilution Liquid/solid Ratio | Flexural Strength kg/cm² | % Fibre in Plaques | Bauer McNett Sizing % | | |
|---|---|---|---|---|---|
| | | | +4 | +14 | −200 |
| 0 | 198 | 12.5 | 0.5 | 8.9 | 52.8 |
| 5 | 210 | 12.5 | 5.4 | 19.0 | 57.8 |
| 10 | 199 | 12.5 | 2.8 | 14.3 | 63.3 |
| 10 | 217 | 12.5 | 7.6 | 20.6 | 62.6 |
| 20 | 211 | 12.5 | 1.4 | 9.9 | 65.2 |

EXAMPLE 35

A sample (600 g) of low grade fibre (Group 7D type) produced in the conventional dry fiberising process was contacted at ambient temperature with 1500 ml of an aqueous solution containing 5% "Matexil" WA-OT and 0.5% dodecylbenzyene sulphonic acid. This suspension was passed twice through a colloid mill to induce fiberising and then diluted with 3 liters of 0.2% "Matexil" WA-OT solution. This mixture was subjected to centrifuging for sufficient time to remove all visually discernible suspended particles from the supernatent liquid, which was then separated from the residual solids. One liter of the opalescent supernatent liquid was diluted by pumping through a spray nozzle into 100 liters of water. Stringy fibre agglomerates were formed which were collected by centrifuging in a solid bowl centrifuge and finally dewatered by filtration. The dry weight of the collected solids was 43 g.

The fibre product was evaluated by measuring the flexural strength of asbestos cement plaques, which was 212 kg/cm² at 11.4% fibre content, and the Bauer McNett sizing, which showed 9.1% +4 mesh, 22.0% +14 mesh and 45.2% −200 mesh, thus demonstrating the formation of fibrous particles, having dimensions useful for reinforcing asbestos cement, from components of colloidal dimensions.

EXAMPLE 36

The remaining centrifuged supernatent liquid of Example 35 was recombined with the residue from the centrifuge by stirring, and the mixture passed through a colloid mill. This suspension was diluted with 8 liters of 2% "Matexil" WA-OT and then 2 liters of the mixture was extensively diluted as in Example 35. The agglomerated solids were collected as in Example 35.

Testing of the fibre product showed a flexural strength of asbestos cement plaques containing 11.0% fibre of 274 kg/cm² and a Bauer McNett sizing of 19.6% +4 mesh, 34.6% +14 mesh and 41.2% −200 mesh.

EXAMPLE 37

The solid from the first hydrocyclone underflow of Example 15 (400 g) was fiberised for 5 minutes in a high speed macerator in 1200 ml of 5% "Matexil" WA-OT at room temperature. This suspension was diluted with 4 liters of 0.2% "Matexil" WA-OT and cleaned of grit and specules by passing successively through an 18 mesh screen and then a hydrocyclone. The overflow stream from the hydrocyclone was extensively diluted by pumping through a spray nozzle into 60 liters of water. The coagulated suspension was further cleaned by passing through a hydrocyclone and the fibrous agglomerates collected in a centrifuge.

The yield of fibre product (dry basis) was 8.9% and the flexured strength of asbestos cement plaques containing 9.5% fibre was 159 kg/cm².

EXAMPLE 38

The solid from the second hydrocyclone underflow of Example 15 (500 g) was contacted with 1500 ml of 5% "Matexil" WA-OT heated to 70° C. This suspension was fiberised by passing three times through a high speed disc mill (100 micron gap between plates) and then diluted with 10 liters of 0.2% "Matexil" WA-OT. After settling to remove grit, the supernatent suspension was diluted by pumping through a jet into 100 liters of water. The suspension of fibrous agglomerates was classified by passing through a hydrocyclone and the product solids collected from the overflow in a centrifuge.

The yield of fibre product (dry basis) was 20% and the flexural strength of asbestos cement plaques containing 12.5% fibre was 279 kg/cm².

EXAMPLE 39

The solid from the centrifuge residue of Example 15 (200 g) was mixed at room temperature with 600 ml of 5% "Matexil" WA-OT solution, to which sufficient sulphuric acid was added to give an initial pH of 4. This mixture was fiberised for 2 minutes in a high speed macerater and the viscous product then diluted with 4 liters of 0.2% "Matexil" WA-OT, adjusted initially to pH 4. This suspension was diluted by adding slowly to 50 liters of water to bring about coagulation of the fibres. The fibrous agglomerates were separated in a solid bowl centrifuge and finally dewatered in a pressure filter (moisture content of cake was 65%).

The yield of fibre product (dry basis) was 59% and the flexural strength of asbestos cement plaques containing 11.0% fibre was 233 kg/cm².

EXAMPLE 40

The experiments described in Examples 37, 38 and 39 used as raw materials the three fractions derived from a particular sample of mill feed as described in Example 15.

This example compares the yield from these three experiments, calculated as a % of the original mill feed, with the yield obtained from a sample of the same mill feed by a conventional dry fiberising process. The total yield of fibre product, based on the mill feed, obtained using the particular variants of the process of the invention thus exemplified is as follows.

| | |
|---|---|
| Example 37 | 6.8% of mill feed |
| Example 38 | 3.4% of mill feed |
| Example 39 | 4.1% of mill feed |
| Total | 14.3% of mill feed |

This is to be compared with the yield of 6% fibre product indicated by tests in a commercial "core laboratory" using the dry fiberising process with the corresponding mill feed sample.

EXAMPLE 41

Samples of mill feed were added to solutions of the surfactants listed in the table below. The effectiveness of the surfactant solution in forming a dispersion was measured by the swelling of the pieces of mill feed after one hour contact with the solution. The effectiveness was assessed visually and the surfactant solutions ranked 1 to 10 on an increasing scale of effectiveness.

Similar solutions containing mill feed were prepared and subjected to shearing action in a vitamizer. The effectiveness of the solution in forming a dispersion under such shearing action was again assessed visually and the surfactant solutions ranked as before.

The results are recorded in the following table:

| Surfactant | Ranking Standing undisturbed | Ranking Shearing action |
|---|---|---|
| Sodium oleate | 8 | 9 |
| Sodium stearate | 6 | 7-8 |
| Oleic acid | 7 | 8 |
| Sodium laurylsulphate | 8 | 8 |
| Sodium dihexylsulphosuccinate | 6 | 6 |
| Sodium diamylsulphosuccinate | 8 | 7 |
| Sodium dioctylsulphosuccinate | 10 | |
| Disodium N-octadecyl sulphosuccinamate | 7 | 7 |
| Sodium dodecylbenzenesulphonate | 10 | |
| "Monfluor" 31 | 10 | |
| Sodium salt of sulphated nonylphenol | 7 | 7 |
| Dodecylbenzenesulphonic acid | 7 | 10 |
| "Dispersol" AC (naphthalene sulphonate) | 7 | 7 |
| "Alkanate" ND | 8 | 8 |
| Poly(12-hydroxystearic acid) | 8 | 8 |
| "Teric" 305 | 8 | |
| "Teric" 306 | 6 | |
| Polyethyleneglycol methacrylate | 6 | 6 |
| "Teric" 9A8 (ethoxylated fatty acid) | 6 | 6 |
| "Teric" 12A4 (ethoxylated fatty acid) | 8 | 6 |
| "Teric" PE64 | 6 | 6 |
| "Elvanol" 70-05 (polyvinyl alcohol) | 6 | 8 |
| "Gohsenol" NH-26 (polyvinyl alcohol) | 6 | 9 |
| Calcium lignosulphonate | 8 | 8 |
| Dextrin | 8 | 8 |
| Tannin | 7 | 7 |
| "Monfluor" 51 (non-ionic) | 7 | 7 |
| "Teric" N8 (ethoxylated nonylphenol) | 6 | 7 |
| Glycol oleate | 9 | 8 |
| Glycol laurate | 9 | 8 |
| "Monfluor" 71 (cationic) | 8 | 8 |
| "Vantoc" CL | 7 | 8 |
| "Centrimide" | 8 | 8 |
| "Calgon" | 6 | 7 |
| Sodium tripolyphosphate | 7 | 7 |

("Dispersol", "Alkanate", "Elvanol", "Gohsenol" and "Calgon" are Registered Trade Marks).

EXAMPLE 42

A solution (1 liter) of "Vantoc" CL (5%) was heated to 90° C. To this solution was added mill feed (1 kg) and the mixture kept at 90° C. for two hours. The mixture was then ball milled for twenty minutes. The resultant flocculated gel was then dewatered by filtering and the fibre was mixed with water and pumped through a hydrocyclone. The overflow was collected and dewatered in a pressure filter. A portion of the fibre product was then oven dried; a yield of 13.8% of good quality fibre was obtained.

EXAMPLE 43

A sample of dispersed fibres prepared as described in Example 27 was introduced into a pipe through which water was flowing at the rate of 6 liters/min. The dispersion was sprayed into the water in the direction of water flow at a rate of 0.5 liter/min. The agglomerated slurry was sampled at a point beyond the area of turbulence and the sample allowed to stand. Settling of the fibre product was fairly rapid, and the supernatant was about two-thirds of the total volume after 10 minutes standing.

EXAMPLE 44

The procedure of Example 44 was repeated except that the dispersed fibre sample was not sprayed into the flowing water, but entered the pipe at the same point as the water. The area of turbulence was substantially reduced compared with that of Example 44, and the final slurry settled at about four times the rate. The volume of supernatant was five-sixth of the total volume.

EXAMPLE 45

A fibre concentrate (670 g) was added to a 5% solution of "Matexil" WA-OT (2000 ml), preheated to 90° C., and the mixture fiberised for a short time in a high speed macerator in several batches. The resultant recombined slurry was diluted with 13.5 liter of 0.25% "Matexil" WA-OT and split into six indentical parts, each of which was diluted to agglomerate the fibres by adding to 20 liters of water in different ways. The coagulated products were each collected using a centrifuge.

Five of the coagulation stage experiments were carried out with different combinations of pumps linked with various sprays and jets. In a sixth case the fibre dispersion was dumped rapidly into the dilution water. All of the methods showed good flexural strength values for asbestos cement plaques, and similar Bauer-McNett sizing characteristics, and were better in both respects than the fibre concentrate used as raw material. The results are recorded below.

Pump (A) was of conventional impeller drive, while pump (B) was of peristaltic design to provide a gentle pulsating flow. Jet (1) produced a fan-shaped stream and jet (2) was a length of rubber tubing that could be directed to various parts of the slurry. Spray (2) was a device giving a multiplicity of fine spray jets radiating from a common point, and spray (6) differing in that the fine spray jets were essentially parallel to one another.

| Dilution Method | Flexural Strength kg/cm$^2$ | % Fiber in Plaques | Bauer McNett Sizing % +4 | +14 | −200 |
|---|---|---|---|---|---|
| Pump (A), Jet (1) | 307 | 11.0 | 38.4 | 46.1 | 41.2 |
| Pump (A), Spray (a) | 297 | 11.0 | 40.9 | 48.7 | 38.7 |
| Pump (B), Spray (b) | 266 | 11.0 | 44.0 | 49.8 | 38.1 |
| Pump (B), Spray (a) | 294 | 11.0 | 43.7 | 51.7 | 36.9 |
| Pump (B), Jet (2) | 316 | 11.0 | 38.2 | 46.3 | 43.0 |
| Dumped | 276 | 11.0 | 34.1 | 43.0 | 40.8 |
| Fiber Concentrate | 286 | 17.4 | 1.4 | 1.4 | 72.0 |

We claim:

1. A process for separating asbestos fibres from asbestos-bearing material selected from the group consisting of crude ore, fibre concentrates, mine wastes and tailings, which process includes the following steps:
   (1) a contacting step where the asbestos-bearing material is treated with a solution containing a surfactant adsorbable on or reactable with asbestos to form a viscous slurry dispersion,
   (2) a mechanical fiberising step, (3) a dilution step to reduce slurry viscosity without inducing coagulation of the fibres, (4) a classification step to remove unwanted grit, (5) a slurry dilution step sufficient to induce coagulation of fibres and form stringy fibre agglomerates, and (6) a dewatering step to recover the asbestos fibres.

2. A process according to claim 1 wherein the said solution comprises an aqueous medium.

3. A process according to claim 2 wherein the weight ratio of water to solids in the dispersion is in the range from 1:2 to 20:1.

4. A process according to claim 2 wherein the weight ratio of water to solids in the dispersion is in the range from 3:2 to 6:1.

5. A process according to claim 2 wherein the surfactant concentration in the aqueous phase is above 0.01% w/w.

6. A process according to claim 5 wherein the surfactant concentration in the aqueous phase is above 1% w/w.

7. A process according to claim 1 wherein the said surfactant is selected from the group consisting of anionic, non-ionic, cationic, and amphoteric surfactants.

8. A process according to claim 7 wherein the anionic surfactant is selected from the group consisting of carboxylates, N-acylsarcosinates, alkanesulphonates, linear and branched alkylarylsulphonates, dialkyl sulphosuccinates, arylsulphonates, naphthalenesulphonates, N-acyl-N-alkyllaurates, 2-sulphoethyl esters of fatty acids, olefin sulphonates, alkyl sulphates, sulphated natural oils, sulphated alkylphenol alkoxylates, and phosphate esters of alkanols and phenol and alkylphenol alkoxylates.

9. A process according to claim 8 wherein the anionic surfactants contain alkyl groups selected from the group consisting of nonyl, decyl, dodecyl, tridecyl, stearyl, cetyl, palmityl and myristyl.

10. A process according to claim 8 wherein the sulphosuccinates are selected from the group consisting of sodium dihexyl sulphosuccinate, sodium di(isobutyl)sulphosuccinate, sodium dioctylsulphosuccinate, magnesium dioctylsulphosuccinate, disodium N-octadecylsulphosuccinamate, tetrasodium N-(1,2-dicarbethoxyethyl)-N-octadecyl sulphosuccinamate, and the sodium sulphosuccinate esters of lauric mono- and di-ethanolamides or of ethoxylated lauryl or decyl alcohols.

11. A process according to claim 8 wherein the alkyarylsulphonates are selected from the group consisting of dodecylbenzenesulphonic acids and derivatives thereof.

12. A process according to claim 7 wherein the non-ionic surfactant is selected from the group consisting of fatty acid esters, alkoxylated aliphatic alcohols and alkylphenols, alkoxylated fatty acids and fatty acid amides, and natural fats and oils.

13. A process according to claim 12 wherein the alkoxylates are ethoxylates containing from 1 to 50 ethyleneoxy (—$CH_2CH_2$—O—) units per molecule.

14. A process according to claim 13 wherein the aliphatic alcohols are selected from the group consisting of ethylene glycol, propylene glycol, glycerol, diethylene glycol, oleyl alcohol, lauryl alcohol, cetyl alcohol, stearyl alcohol, tridecyl alcohol, myristyl alcohol, trimethylnonyl alcohol, primary $C_{12}C_{13}$ and $C_{12}$-$C_{15}$ alcohols, secondary $C_{11}$-$C_{15}$ alcohols, tallow, sorbitan, and polyethylene glycol, and the alkylphenols are selected from the group consisting of nonylphenol, dodecylphenol, octylphenol, isooctylphenol, and $C_8$-$C_{12}$-alkyl-phenols.

15. A process according to claim 12 wherein the fatty acids are selected from the group consisting of lauric acid, stearic acid, oleic acid, coco acid, capric acid and myristic acid, ricinoleic acid, and acids derived from tall oil, soybean oil, rosin, tallow, lard, cottonseed, and safflower oil.

16. A process according to claim 12 wherein the amines used to prepare the fatty acid amides are selected from the group consisting of ethanolamine, diethanolamine, and isopropanolamine.

17. A process according to claim 7 wherein the cationic surfactant is selected from the group consisting of aliphatic mono-, di-, and poly-amines, amine salts, amine oxides of the general formula

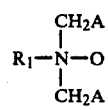

wherein A is hydrogen or hydroxyl, and $R_1$ is selected from the group consisting of cetyl, lauryl, myristyl, stearyl, coco, decyl, hexadecyl and octadecyl, alkoxylates of alkyl and alicyclic amines, 2-alkyl-1-(hydroxyethyl)-2-imidazolines, tetrakis-substituted ethylenediamines, amide-linked amines of the general formula

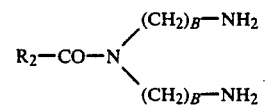

wherein $R_2$—CO—N is derived from the group consisting of coconut, oleic, stearic, and tall oil acids, and B is 2 or 3, and quaternary ammonium salts.

18. A process according to claim 17 wherein the alkoxylates of alkyl and alicyclic amines are ethoxylates of amines selected from the group consisting of cocoamine, soya-amine, tallow-amine, stearylamine, and resin.

19. A process according to claim 17 wherein the quaternary ammonium salts are selected from the group consisting of dialkyldimethylammonium salts, alkylbenzyl dimethylammonium salts, alkyltrimethylammonium salts, benzyltrimethylammonium salts, and alkylpyridinium salts.

20. A process according to claim 14 wherein the alkyl is selected from the group consisting of coco, tallow, soya, stearyl, cetyl, lauryl, and myristyl.

21. A process according to claim 7 wherein the amphoteric surfactant is selected from the group consisting of N-coco-3-aminopropionic acid, disodium N-lauryl-3-iminodipropionate, N-carboxymethyl-N-cocoalkyl-N,N-dimethylammonium hydroxide, the sodium salt of N-hydroxyethyl-N-lauromido-$\beta$-alanine, and substituted 2-imidazolinium hydroxides.

22. A process according to claim 7 wherein the surfactant comprises sodium dioctylsulphosuccinate.

23. A process according to claim 7 wherein the surfactant comprises dodecylbenzenesulphonic acid.

24. A process according to claim 7 wherein the surfactant comprises an ethoxylated amine prepared by the condensation of a $C_{17}$ diamine with 3 moles of ethylene oxide.

25. A process according to claim 7 wherein the surfactant comprises the nitrate salt of an ethoxylated amine prepared.

26. A process according to claim 1 wherein the temperature of the dispersion is in the range from ambient to 400° C.

27. A process according to claim 26 wherein the temperature is in the range from 50° to 200° C.

28. A process according to claim 1 wherein the concentration of surfactant in the diluted phase is in the range from 0.01 to 0.1% w/w.

29. A process according to claim 1 wherein the said asbestos-bearing material comprises low grade short fibre.

30. A process according to claim 1 wherein the said asbestos-bearing material is chrysotile.

31. A process according to claim 1 wherein the said asbestos-bearing material is subjected to wet crushing and grinding, optionally with classification, prior to the contacting step.

32. A process according to claim 31 wherein surfactant solution recovered from the slurry dilution step (3) is used in the wet crushing and grinding.

33. Stringy agglomerates of asbestos fibres prepared by the process of claim 1, the asbestos fibres being bonded together by said surfactant and said coagulation.

34. Stringy agglomerates of asbestos fibres according to claim 33 containing an amount of surfactant that is less than 20% w/w of the said asbestos fibres.

35. Stringy agglomerates of asbestos fibres of claim 34 wherein the said amount of surfactant is less than 10% w/w of the said asbestos fibres.

36. A process according to claim 1 wherein, in the slurry dilution step, the dispersion and diluent are sprayed simultaneously onto a screen mesh from a multiplicity of jets to recover the asbestos fibres.

37. A process according to claim 33 wherein the diluent used in the slurry dilution step is an aqueous medium.

38. A process according to claim 37 wherein the said aqueous medium contains a polymeric flocculating agent.

39. A process according to claim 37 wherein the said polymeric flocculating agent is a polyacrylamide.

40. A process according to claim 37 wherein the weight ratio of diluent to dispersion is in the range from 20:1 to 1500:1.

41. A process according to claim 29 wherein the weight ratio of diluent to dispersion is in the range from 70:1 to 400:1.

42. A process according to claim 36 wherein the asbestos-bearing material is treated prior to the contacting step with surfactant solution recovered from the slurry dilution step.

43. A process according to claim 36 wherein the recovered asbestos fibres are treated with a solution of an alkaline reagent.

* * * * *